United States Patent [19]

Showalter et al.

[11] Patent Number: 5,358,221
[45] Date of Patent: Oct. 25, 1994

[54] BLOCK ASSEMBLY FOR USE IN METAL SCARFING APPARATUS

[75] Inventors: Michael S. Showalter; John G. Dawson, Jr., both of Florence; Frank J. Gusky, Quinby, all of S.C.

[73] Assignee: The Esab Group, Inc., Florence, S.C.

[21] Appl. No.: 33,601

[22] Filed: Mar. 19, 1993

Related U.S. Application Data

[63] Continuation-in-part of Ser. No. 988,450, Dec. 10, 1992, Ser. No. 805,111, Dec. 9, 1991, Pat. No. 5,234,658, and Ser. No. 948,027, Sep. 21, 1992, Pat. No. 5,304,256.

[51] Int. Cl.⁵ .................................................. B23K 7/06
[52] U.S. Cl. ............................................ 266/51; 266/48
[58] Field of Search .................................... 266/48, 51

[56] References Cited

U.S. PATENT DOCUMENTS

| | | | |
|---|---|---|---|
| 2,468,824 | 5/1949 | Hughey | 266/51 |
| 2,496,923 | 2/1950 | Walters et al. | 266/51 |
| 2,521,199 | 9/1950 | Babcock | 266/48 |
| 2,531,006 | 11/1950 | Smith | 266/48 |
| 2,838,431 | 6/1958 | Allmang et al. | 266/51 |
| 3,230,116 | 1/1966 | Wandelt | 266/51 |
| 3,231,431 | 1/1966 | Allmang | 266/51 |
| 3,477,646 | 11/1969 | Lytle | 266/51 |
| 3,647,570 | 3/1972 | Lytle | 266/51 |
| 4,038,108 | 7/1977 | Engel et al. | 266/51 |
| 4,115,154 | 9/1978 | Fuhrhop | 266/51 |
| 4,173,499 | 11/1979 | Hölemann | 266/48 |
| 4,455,176 | 6/1984 | Fuhrhop | 266/51 |
| 4,501,624 | 2/1985 | Lotz | 266/50 |
| 4,765,597 | 8/1988 | Fuhrhop et al. | 266/51 |
| 4,954,683 | 9/1990 | Hatch | 219/121.5 |

FOREIGN PATENT DOCUMENTS

| | | |
|---|---|---|
| 1213203 | 6/1963 | Fed. Rep. of Germany . |
| 2404013 | 1/1974 | Fed. Rep. of Germany . |
| 2948777 | 6/1981 | Fed. Rep. of Germany . |
| 2-274377 | 2/1990 | Japan . |

*Primary Examiner*—Scott Kastler
*Attorney, Agent, or Firm*—Bell Seltzer Park

[57] ABSTRACT

A block assembly for a thermochemical scarfing apparatus which allows a greater diagonal standoff distance from the metal workpiece during preheating. The block assembly comprises a base member and an extension releasably joined to the base member, and the base member and extension include an internal network of gas distribution lines for separately delivering both oxygen and fuel gas to each of a plurality of discharge openings which are disposed in a longitudinal row along the front face of the extension. A nozzle insert is releasably mounted in each discharge opening, such that during preheating, the oxygen may be discharged from each discharge opening as a central high velocity stream and the fuel gas may be discharged as a concentric stream which coaxially surrounds the central stream, and so that the momentum of the central stream is maintained. The effective flame heating distance thereby may be extended during preheating, and the block assembly may be moved back from the workpiece a significant standoff distance so as to avoid damage from dislodged molten metal slag.

10 Claims, 5 Drawing Sheets

BLOCK ASSEMBLY FOR USE IN METAL SCARFING APPARATUS

CROSS REFERENCE TO RELATED APPLICATIONS

This is a continuation in part of copending applications Ser. No. 07/988,450, filed Dec. 10, 1992; Ser. No. 07/805,111, filed Dec. 9, 1991; and now U.S. Pat. No. 5,234,658; and Ser. No. 07/948,027, filed Sep. 21, 1992, now U.S. Pat. No. 5,304,256. The disclosures of these copending applications are expressly incorporated herein by reference.

FIELD OF THE INVENTION

This invention relates to an apparatus for thermochemically scarfing a metal workpiece, and more particularly, to a block assembly for use in a scarfing apparatus of the described type and which allows a significant diagonal stand-off distance from the end of the workpiece during preheating and scarfing initiation so that molten metal is not blown onto the scarfing apparatus.

BACKGROUND OF THE INVENTION

Steel slabs commonly are conditioned by moving scarfing units along the top, bottom, and side surfaces of a steel slab to eliminate surface defects such as cracks, seams, and slag intrusions. One conventional scarfing apparatus includes top, bottom, and opposite side scarfing units that are mounted across the width and end portions of a support, to concurrently scarf all sides of the slab as the slab is passed therebetween.

Both top, side, and bottom scarfing units all include a manifold and head assembly, which receives and distributes oxygen and fuel gas to upper and lower preheat blocks. The upper and lower preheat blocks are spaced from each other to define between the two blocks an oxygen scarfing slot through which a quantity of oxygen is blown onto the slab surface to enable scarfing. The lower preheat block includes a fuel gas channel having a discharge opening positioned adjacent to the oxygen slot for discharging a fuel gas adjacent to the oxygen flow.

As illustrated for example in U.S. Pat. No. 4,115,154, the upper preheat block typically is a one-piece unit that includes oxygen and fuel gas channels each having discharge orifices to define nozzles through which a combination of oxygen and fuel gas is discharged for preheating the slab before scarfing. Later, a postmix flow of oxygen and fuel gas provides for scarfing. To maintain a proper vertical stand-off distance of the nozzle exits from the steel slab, the top and bottom scarfing units include riding shoes positioned on respective lower preheat blocks. Because the integrally formed nozzles do not provide for a high speed gas flow outward from the scarfing units, the total diagonal stand-off distance, i.e., the vertical stand-off distance and horizontal stand-off distance (the lead distance from the scarfing unit to the slab) is small, and the scarfing units must be placed in close proximity to the slab during preheating. Thus, in a conventional scarfing unit as illustrated in the above referenced patent, the upper preheat block extends forward and hangs over the lower preheat block to direct the preheating stream of gas discharged from the upper preheat block onto the slab during preheating.

Because the upper preheat block extends forwardly beyond the lower preheat block during initial preheating of the slab, the molten steel formed on the slab edge may drip onto portions of the upper preheat block positioned below the slab. The molten steel may damage the upper preheat block requiring reconstruction or replacement of the preheat blocks. To avoid this problem, during initial preheating, the scarfing units are positioned adjacent to the slab and heat the slab one to two inches inward of the end to prevent steel and slag from dripping onto the forwardly extending preheat block. As a result of starting the scarfing process inward from the end of the steel slab, the one or two inches of unscarfed steel must be either scrapped or hand scarfed, leading to excessive production costs.

Additionally, through continued use, the discharge ends forming the upper preheat nozzles may wear. Because the preheat nozzles are integrally formed in the upper preheat block, any damage to the nozzle area mandates either replacement of the entire upper preheat block, or removal of the damaged area and the brazing of new material onto the upper preheat block.

It is an object of the present invention to provide a scarfing apparatus that allows a greater diagonal stand-off distance from the metal workpiece during preheating and initial scarfing, and so that significant quantities of molten metal are not blown onto the scarfing apparatus.

It is a more particular object of the present invention to provide a block assembly for a scarfing apparatus which includes a number of nozzles for directing a high speed preheating gas stream toward the workpiece with the gas stream comprising separate streams of oxidizing gas and fuel gas, which are adapted to be ignited at a substantial distance from the scarfing apparatus, and so that particles of molten metal are not blown onto the apparatus in significant quantities.

It is a further object of the present invention to provide a block assembly for a scarfing apparatus of the described type, and which includes a gas distribution network internally within the block assembly for efficiently and effectively distributing two separate gases, namely oxygen and fuel gas, to each of the nozzles of the apparatus.

SUMMARY OF THE INVENTION

The above and other objects and advantages of the present invention are achieved in the embodiment illustrated herein by the provision of a block assembly for a scarfing apparatus which comprises a block of metallic material including opposite front and rear faces, opposite upper and lower faces, and opposite end faces which define a longitudinal direction therebetween. A plurality of discharge openings are positioned adjacent each other in a longitudinal row along the front face and the openings extend rearwardly into the block a substantial distance, and so that each opening defines an inner end which is spaced from the rear face of the block. A first internal bore extends longitudinally within the interior of the block and communicates with each of the discharge openings at a medial portion of the rearward length of such openings. A second internal bore extends longitudinally within the interior of the block and communicates with each of the discharge openings adjacent the inner end thereof. First duct means is provided for delivering a first gas, namely fuel gas, to the first internal bore, and second duct means is provided for delivering a second gas, namely oxygen, to the second bore. Thus, the first and second gases may be concurrently delivered into each of the discharge openings at spaced apart locations and so that the gases flow outwardly from each of the discharge openings at said front face.

In the preferred embodiment, the block assembly is composed of two separate components, namely a rear or base member and an outer member or extension. The splitting of the block into two components permits the extension, which is subjected to the most wear, to be easily removed, repaired, and replaced at a significantly reduced cost as compared to a single piece block.

The block assembly of the present invention further includes an elongate nozzle insert disposed in each of the discharge openings. Each nozzle insert comprises a central bore extending axially through the length thereof and so as to define an inner end of the central bore which communicates with the inner end of the associated discharge opening and thus with the second internal bore. Sealing means is positioned to cooperate with the portion of the associated discharge opening between the first and second internal bores for forming a seal between such portion of the associated discharge opening and the outer periphery of the nozzle insert. A plurality of axially extending substantially parallel flutes are spaced about the exterior surface of the nozzle insert and between the first internal bore and the front face of the block and such that the flutes and the discharge opening define an outer channel which extends from the first internal bore to the front face of the block. By this arrangement, the oxygen may be discharged from the central bore of each of the nozzle inserts as a central gas stream and while the fuel gas may be discharged from each of the nozzle inserts as a concentric stream disposed coaxially about the central stream.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
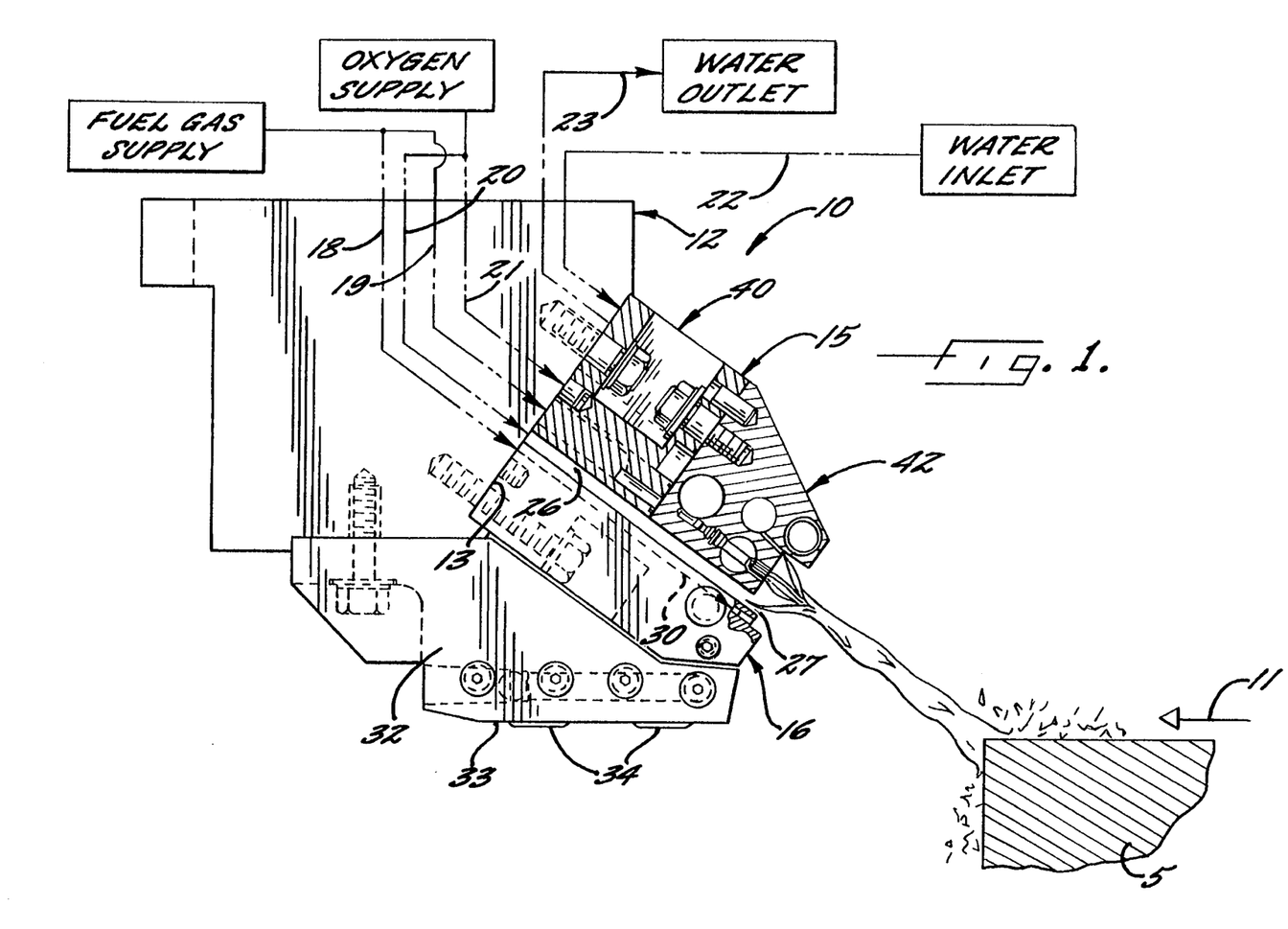
FIG. 1 is a partly sectioned and partly schematic side elevation view of a scarfing apparatus which embodies the features of the present invention and which is positioned for preheating a steel slab before the commencement of the scarfing operation.
Figure 2:
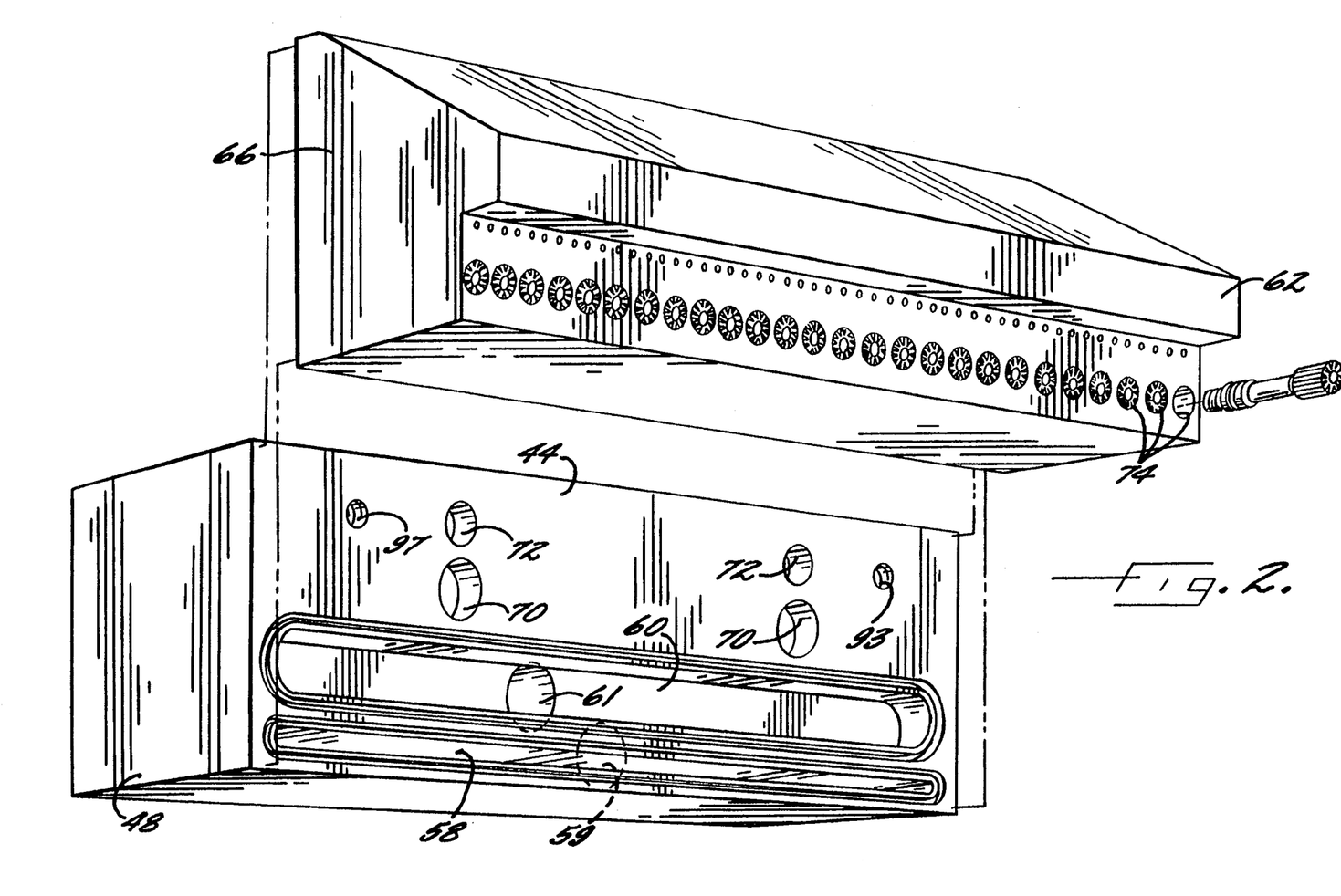
FIG. 2 is a perspective and exploded view of the base member and extension of the upper preheat block assembly of the apparatus shown in FIG. 1.

Referring more particularly to the drawings, FIG. 1 illustrates a scarfing apparatus 10 which embodies the features of the present invention. The illustrated scarfing apparatus 10 represents the upper scarfing unit of an overall system, which typically comprises similar scarfing apparatus positioned above and below the plane of the steel slab S to be scarfed, with the upper and lower scarfing apparatus extending across the full width of the slab S. Additionally, side scarfing apparatus of like design are positioned so as to scarf the sides of a slab S. The slab S normally is positioned on a movable roll table (not shown) so as to be fed through the rectangular configuration defined by the several scarfing apparatus, and in the direction of the arrow 11.

In accordance with the present invention, the scarfing apparatus 10 is constructed to allow a significant stand-off distance from the slab S during preheating so that preheating can occur on the end corner of the slab without having significant amounts of slag or other hot, molten metal falling onto the apparatus, as occurs in other, conventional scarfing units during initial starting adjacent the front edge of the slab.

As shown in FIG. 1, the apparatus 10 includes a manifold and head assembly 12, typically formed from a block of bronze or copper material, and the block defines a generally planar front surface 13 upon which an upper preheat block assembly 15 and a lower preheat block 16 are mounted. The block of the manifold and head assembly 12 also includes a pair of internal fuel gas lines 18 and 19, a pair of oxygen lines 20 and 21, and inlet and outlet water lines 22 and 23 respectively, and all of these lines communicate with the front surface 13 for the purposes described below.

The upper preheat block assembly 15 and the lower preheat block 16 are spaced from each other to define an oxygen slot 27 and discharge orifice 27 of predetermined size for receiving a flow of scarfing oxygen from the oxygen line 20 of the manifold and head assembly and discharging the scarfing oxygen through the discharge orifice 27 onto the steel slab S during the scarfing operation.

The lower preheat block 16 includes a fuel gas outlet which preferably takes the form of a plurality of openings 28 (FIG. 4) which are positioned adjacent the orifice 27 and are spaced apart longitudinally (i.e. in a direction perpendicular to the plane of FIG. 1) along the length of the block. These openings 28 communicate with a fuel gas distribution duct 30 in the block 16, which in turn communicates with the fuel gas line 18 in the manifold and head assembly 12. Fuel gas is thus able to flow through the fuel gas flow line 18 of the manifold and head assembly 12 into the fuel gas distribution duct 30, and then exit through the openings 28 to form part of a scarfing flame during scarfing. A riding shoe is mounted to the manifold and head assembly 12 along the underside of the lower preheat block 16. The riding shoe 32 includes a lower surface 33 having slab engaging skids 34 adapted to contact the slab to position the scarfing discharge orifice 27 as well as the other exiting fuel and oxygen flows a predetermined distance from the steel slab. As shown in FIG. 1, the scarfing apparatus 10 is above the slab S, and it will be understood that similar apparatus are arranged below and at the opposite sides of the slab S.

Figure 4:
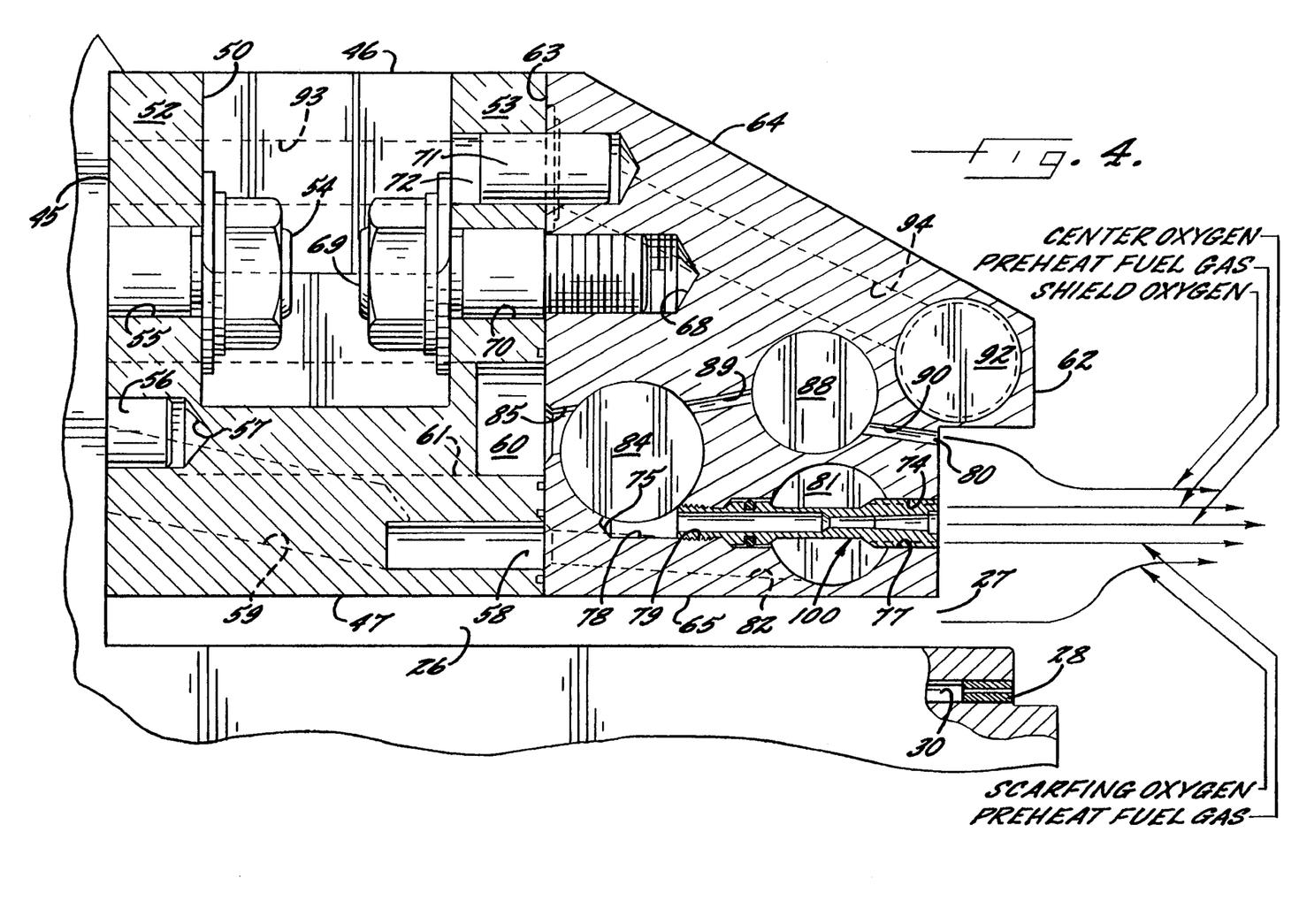
FIG. 4 is a sectioned side elevation view of the block assembly and illustrating the internal gas distribution network of the assembly.
Figure 5:
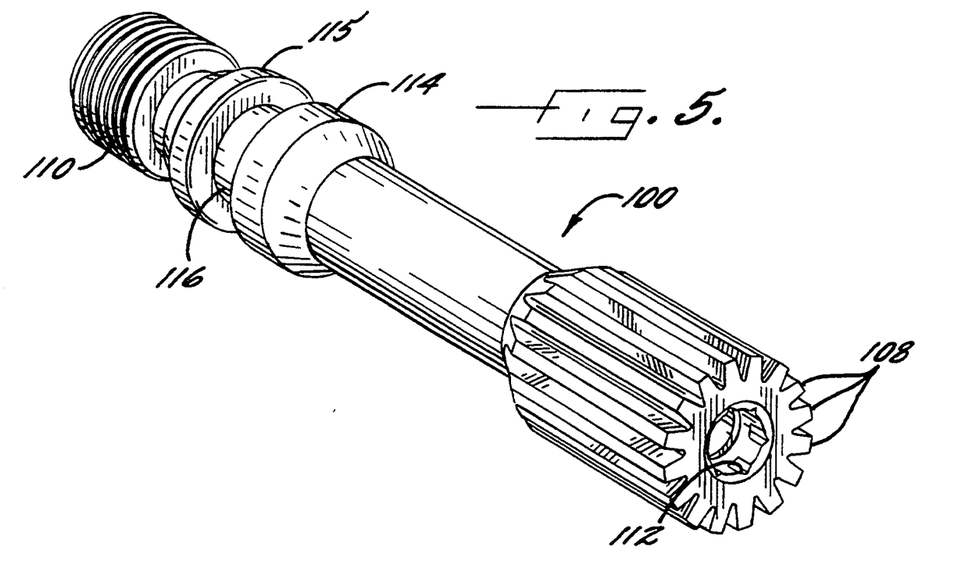
FIG. 5 is a perspective view of a preferred embodiment of the nozzle insert adapted for use in the block assembly of the present invention.

Each upper preheat block assembly 15 includes a base member 40, and an extension 42 secured to the base member 40 and extending forwardly therefrom. The base member 40 comprises a block of metallic material, preferably copper, and it includes opposite front and rear faces 44, 45, opposite upper and lower faces 47, and opposite end faces 48, 49, which define a longitudinal direction therebetween. The upper face includes a U-shaped channel 50 as best seen in FIG. 4, so as to define a rear wall 52 and a front wall 53. The rear face 45 of the member is releasably secured to the front surface 13 of the manifold and head assembly by means of bolts 54 which extend through the rear wall 52. A pair of dowel pins 56 extend into closed bores 57 in the rear wall to further secure and accurately position the base member 40 to the front surface 13.

The base member 40 also includes a first gas outlet in the form of an elongate channel 58 which extends longitudinally and communicates with the front face 44 of the block, and a first gas supply duct 59 extends through the block from said rear face 45 thereof to the first gas outlet channel 58. The first gas supply duct 59 in turn communicates with the fuel gas supply line 19 in the manifold and head assembly 12.

A second gas outlet in the form of a second longitudinally elongate channel 60 communicates with the front face 44 of the block, and a second gas supply duct 61 extends through the block from said rear face 45 thereof to the second gas outlet 60. The second gas supply duct 61 in turn communicates with an oxygen supply line 21 in the manifold and head assembly.

The extension 42 comprises a block of metallic material, preferably copper, and it includes opposite front and rear faces 62, 63, opposite upper and lower faces 64, 65, and opposite end faces 66, 67, which define a longitudinal direction therebetween. The rear face 63 of the extension includes a pair of threaded openings 68 for receiving a pair of mounting bolts 69 which extend through openings 70 from the front wall 53 of the base member. Also, a pair of dowel pins 71 may be secured in bores in the rear face of the extension, which are closely received in bores 72 in the front wall 53. By this arrangement, the extension 42 is releasably and securely joined to the base member 40, with the rear face 63 of the extension overlying and engaging the front face 44 of the base member.

The extension 42 further comprises a plurality of discharge openings 74 which are positioned adjacent each other in a longitudinal row along the front face 62 and extending rearwardly into the block a substantial distance, and so that each opening 74 defines an inner end 75 which is spaced from the rear face 63. Also each of the discharge openings has an outer portion 77 (FIG. 4) of relatively large diameter, and an inner portion 78 adjacent the inner end 75 which is of relatively smaller diameter. A medial portion 79 of each opening 74 is internally threaded, so that each discharge opening is adapted to threadedly mount an insert 100 therein which has an externally threaded inner end, and as further described below.

A longitudinally extending row of discharge outlets 80 is provided in the front face 62 of the extension 42, with the row of outlets 80 extending parallel to and above the row of openings 74.

A first internal bore 81 extends longitudinally within the interior of block of the extension 42 and communicates with each of the discharge openings 74 at a medial portion of the rearward axial length of the openings. A first duct means in the form of a plurality of longitudinally spaced apart and parallel ducts 82, extends from the rear face 63 to the first internal bore 81 for delivering fuel gas to the first internal bore. A second internal bore 84 extends longitudinally within the interior of the block and communicates with the inner portion 78 of each of the discharge openings 74. A second duct means in the form of a plurality of longitudinally spaced apart and parallel ducts 85, extends from the rear face 63 to the second internal bore 84 for delivering oxygen to the second internal bore.

The relatively large diameter portion 77 of each opening 74 extends between said front face 62 and the first internal bore 81, and the inner 78 portion of relatively small diameter is positioned between the first internal bore 81 and said second internal bore 84.

Third duct means is provided for delivering the oxygen to each of the discharge outlets. More particularly, the third duct means comprises a third internal bore 88 which extends longitudinally within the interior of the block, first gas passage means communicating between the second internal bore 84 and the third internal bore 88, and second gas passage means extending between the third internal bore 88 and the discharge outlets 80. The first gas passage means comprises a plurality of bores 89 which are coaxial with respective ones of the ducts 85. The second gas passage means comprises a plurality of bores 90 which communicate with respective ones of the outlets 80 and with the third internal bore 88.

The extension 42 also includes a further internal bore 92 extending longitudinally within the interior of the block adjacent the front face 62 thereof, and water passageway means communicating with the further internal bore 92 and with the rear face 63 of the block for circulating water through the further internal bore 92 so as to cool the block. More particularly, the water passage means comprises a water inlet line 93 bore extending from the rear face 45 to the front face 44 of the base member 40, and which communicates with the water inlet line 22 in the manifold and head assembly 12 and with a water inlet line 94 which extends from the rear face 63 of the extension to the further internal bore 92 and parallel to the end face 67 of the block. A return line 96 extends through the extension 42 and communicates with the end of the further internal bore 92 adjacent the end face 66. The return line 96 extends to the rear face 63 of the extension 42, and communicates with a further line 97 extending through the base member. The line 97 of the base member in turn communicates with the water outlet line 23 of the manifold and head assembly.

When the extension 42 and base member 40 are assembled to each other, and to the manifold assembly 12, in the manner illustrated in FIG. 1, it will be understood that the fuel gas which is delivered to the first gas supply duct 59 at the rear face 45 of the base member 40 is delivered through the duct 59 to the first gas outlet channel 58 in the front face. The channel 58 serves to distribute the fuel gas to each of the ducts 82 in the rear face of the extension, under conditions of substantially equal pressure along the full longitudinal length of the extension. The fuel gas is then delivered via the ducts 82 to the first internal bore 81, and so that the pressure along the longitudinal length of the bore 81 is substantially uniform. As a result, the flow rate of the fuel gas into the medial portion of each discharge opening 74 is substantially uniform.

Similarly, the oxygen which is delivered to the oxygen supply duct 61 at the rear face 45 of the base member 40 through the line 21 is delivered through the duct 61 to the gas outlet channel 60 in the front face 44, and the channel 60 serves to distribute the oxygen to each of the ducts 85 in the rear face 63 of the extension under conditions of substantially equal pressure. The oxygen is then delivered via the ducts 85 to the second internal bore 84, and then into the inner portion 78 of each of the discharge outlets 74. The oxygen is also delivered from the second internal bore 84 via the bores 89 to the third internal bore and finally via the bores 90 to respective ones of the discharge outlets 80 on the front face of the extension. The pressure along the longitudinal length of each bore 84 and 88 will be substantially uniform, and as a result, the flow rate of the oxygen through each discharge opening 74 will be substantially uniform, and the flow rate through each discharge outlet 80 will be substantially uniform.

Figure 3:
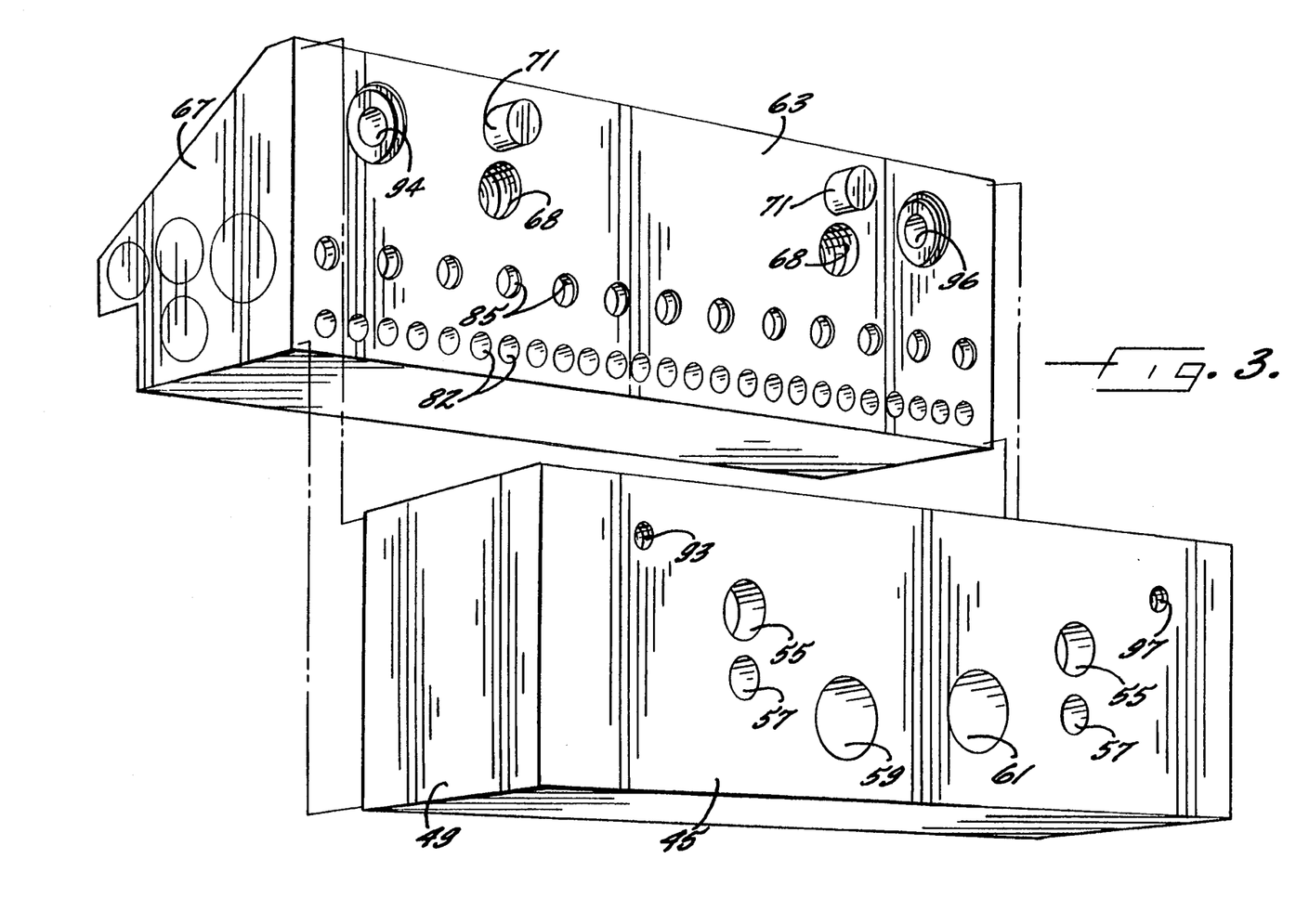
FIG. 3 is a view similar to FIG. 2 but looking from the rear of the block assembly.

The internal bores 81, 84, 88, and 92 of the extension 42 may be conveniently formed by drilling longitudinally into the end face 67 of the extension, and to a point just short of the opposite end face The resulting bores are then capped at the end face as seen in FIG. 3. Also, the other internal bores and ducts in the extension and the base member may be formed by drilling operations, in a manner which will be apparent to those skilled in the art. As a result of this construction, the opposite end faces 48, 49, 66, 67 of the base member and the extension are substantially planar, without protruding external piping connections or the like, and the block assembly may thus be mounted in a side by side arrangement with other like assemblies so as to form an assembly of a longitudinal length necessary to extend across the full width of a slab to be scarfed.

Figure 6:
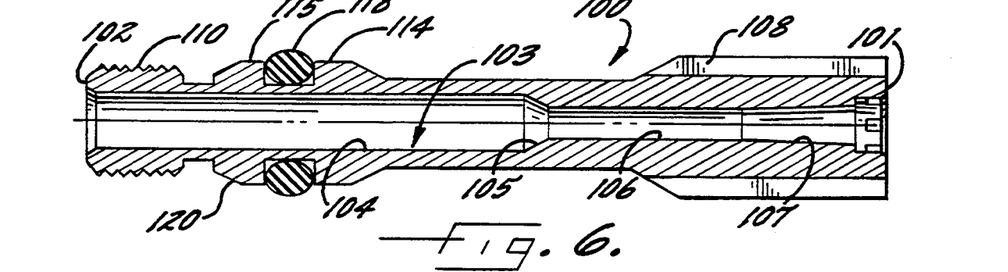
FIG. 6 is a sectional view of the insert of FIG. 5.
Figure 7:
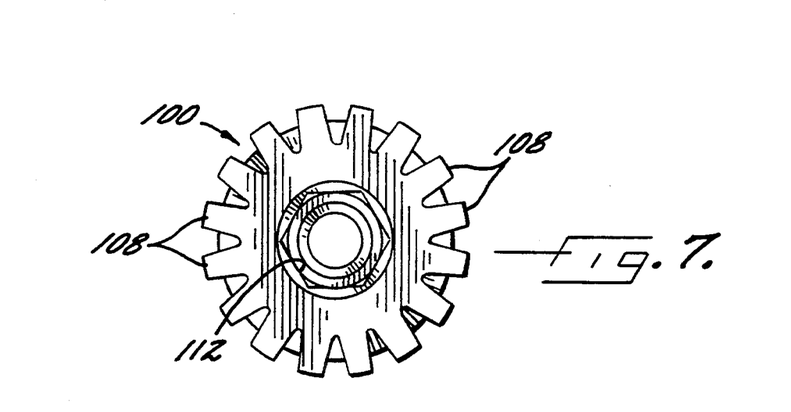
FIG. 7 is an end view of the nozzle insert shown in FIG. 5.

Each discharge opening 74 mounts a nozzle insert 100, as best seen in FIGS. 2 and 5-7. In the illustrated embodiment, each nozzle insert 100 is in the form of an elongate, substantially cylindrical body member which is formed of a unitary piece of a metal such as brass or copper. The body member defines an outer end 101, an inner end 102, and a central bore 103 which extends axially through the length of the nozzle insert. The central bore 103 includes a first portion 104 adjacent the inner end of uniform diameter, a converging throat portion 105, a medial portion 106 of uniform diameter, and a diverging portion 107 adjacent the outer end. The converging throat portion 105 tapers inward at a relatively steep angle as best seen in FIG. 6, and the diverging portion 107 tapers outward at a less steep angle. When assembled in its associated discharge opening 74 as seen in FIG. 4, the outer end 101 of the insert is flush with the front face 62, and the oxygen gas which is received in the inner portion 78 of the opening from the second internal bore 84, is first constricted within the converging portion 105 where the gas velocity is increased. The oxygen then exits the outer end 101 as a high velocity, preferably supersonic, accurately directed stream.

The outer or discharge end portion of each nozzle insert includes a plurality of axially directed flutes 108 spaced about the exterior surface, and so as to extend between the first internal bore 81 of the extension and the front face 62 of the extension. Thus the flutes 108 of the insert and the discharge opening 74 define an outer channel which extends from the first internal bore 81 to the front face 62, and coaxially surrounds the central bore 103 of the insert. The fuel gas may thereby be discharged as a concentric stream which coaxially surrounds the oxygen stream being discharged from the central bore 103 of the insert.

The exterior peripheral surface of each insert also includes an externally threaded portion 110 adjacent the inner end 102. This threaded portion 110 is adapted to engage the mating threaded portion 79 in the cylindrical opening 74 of the block, note FIG. 4, and to facilitate the engagement and disengagement of this threaded interconnection, the bore of the insert is provided with a hex socket 112 at the outer end 101 which is adapted to be engaged by an Allen wrench or the like. A slot may if desired be substituted for the hex socket, to permit engagement by a conventional screwdriver.

The insert 100 also includes a pair of spaced apart shoulders 114, 115 positioned axially between the flutes 108 and the externally threaded portion 110, and so as to form an annular channel 116 therebetween which is adapted to receive a resilient O-ring 118. The rearward shoulder 115 also includes a rearwardly facing frusto-conical surface portion 120 which is adapted to form a metal to metal seat with a mating surface in the cylindrical opening 74 of the block of the extension. The metal to metal seat and the O-ring 118 thus form a seal which precludes gas passage through the discharge openings 74 between the first and second internal bores 81 and 84.

During operation, the apparatus 10 is initially positioned as shown in FIG. 1, together with bottom and side scarfing units (not shown), and the flows of oxygen and fuel gas through the various passageways are controlled to initially preheat the slab S. Because the nozzle insert 100 provides an efficient oxygen and fuel gas flow outward from the apparatus 10 without a sharp fuel gas flow intersection with the oxygen adjacent the nozzles, the momentum of the oxygen exiting the central bore 103 of each insert is maintained until it intersects the fuel gas further downstream from the extension. As a result, a more enhanced and hotter flame is achieved, and the diagonal standoff distance may be increased as compared to other conventional scarfing apparatus. With the present invention, a diagonal standoff distance as high as fifteen inches has been achieved. As a result of this greater diagonal stand-off distance, during initial pre-heating of the slab S, significant amounts of the slag and molten steel do not drop onto the apparatus and the scarfing operation can begin at the end portion of the slab. Additionally, during continued use of the apparatus, the outer ends 101 of the nozzle inserts 100 may become worn. The nozzle inserts 100 can be readily replaced by simply unthreading them from their associated discharge openings, and a new nozzle insert may then be inserted and threaded into its assembled position.

The steps involved in the initial starting of the scarfing process are described in detail in copending application Ser. No. 07/988,450. To briefly summarize, the table (not shown) on which the steel slab S rests is moved into a position in which the scarfing apparatus 10 is positioned over and adjacent an end of the slab. The scarfing apparatus preheat fuel gas is then ignited at a low flow rate, and the preheat oxygen is also discharged at a low flow rate. Also, a small volume flow of oxygen is concurrently directed through the scarfing slot 26 to provide a lower shield flow, note FIG. 4. The preheat fuel gas flow rate is then increased, and just after the preheat fuel gas flow rate is increased, the oxygen preheat flow is increased, and this flow includes a stabilizing oxygen stream immediately above the preheating gas stream emanating from the discharge outlets.

In one preferred embodiment, the central stream of oxygen is discharged from each central bore 103 of the inserts 100 at a substantially supersonic speed, and the concentric stream of fuel gas is discharged at a speed less than the speed of the central stream. Also, the upper and lower oxygen stabilizing streams are discharged at respective speeds which are less than the speed of the stream of fuel gas.

Once the steel slab is preheated, the preheat oxygen flow is substantially reduced and the flow of scarfing oxygen is generated through the slot 26. When the scarfing oxygen has reached its peak pressure and flow rate, the preheating fuel gas is reduced, and the table holding the steel slab is moved toward the scarfing apparatus. The table is initially moved forward at a first relatively slow speed, which is typically about 3 to 4 meters per minute, and after a predetermined period, its speed is increased to the normal scarfing speed, which is about four times as fast as the first speed. The flow rate of the oxygen is decreased slightly at the time when the table speed reaches the normal scarfing speed. Scarfing then continues, and preferably a stream of fuel gas is concurrently discharged from the discharge end of the fuel gas outlet opening 28 of the lower block 16, to facilitate maintenance of the oxidizing reaction. Also, the manifold and head assembly 12 closes so that the skids 34 move into contact with the moving slab S, and the entire apparatus 10 "floats" on the moving slab.

In the drawings and specification, there has been set forth a preferred embodiment of this invention, and even though specific terms are used, they are used in a generic and descriptive sense only and not for purposes of limitation.

That which is claimed is:

1. A block assembly for directing multiple streams of gas onto the surface of a metal workpiece during a scarfing operation, and comprising
   a block of metallic material including opposite front and rear faces, opposite upper and lower faces, and opposite end faces which define a longitudinal direction therebetween,
   a plurality of discharge openings positioned adjacent each other in a longitudinal row along said front face and extending rearwardly into said block a substantial distance, and so that each discharge opening defines an inner end which is spaced from said rear face,
   a first internal bore extending longitudinally within the interior of said block and communicating with each of said discharge openings at a medial portion of the rearward length of said openings,
   a second internal bore extending longitudinally within the interior of said block and communicating with each of said discharge openings adjacent the inner end thereof,
   first duct means for delivering a first gas to said first internal bore,
   second duct means for delivering a second gas to said second internal bore,
   said first duct means and said second duct means each communicating with said rear face of said block,
   each of said discharge openings having a portion of relatively large diameter between said front face and said first internal bore, and a portion of relatively small diameter between said first internal bore and said second internal bore, and
   said portion of relatively small diameter of each discharge opening being internally threaded so that each discharge opening is adapted to threadedly mount an insert therein which has an externally threaded inner end,
   whereby the first and second gases may be concurrently delivered into each of said discharge openings at spaced apart locations and so that the gases flow outwardly from each of said discharge openings at said front face.

2. A block assembly for directing multiple streams of gas onto the surface of a metal workpiece during a scarfing operation, and comprising:
   a base member comprising
      (a) a block of metallic material including opposite front and rear faces,
      (b) a first gas outlet communicating with said front face of said block, and a first gas supply duct extending through said block from said rear face thereof to said first gas outlet,
      (c) a second gas outlet communicating with said front face of said block, and a second gas supply duct extending through said block from said rear face thereof to said second gas outlet, and
   an extension comprising
      (a) a block of metallic material including opposite front and rear faces, opposite upper and lower faces, and opposite end faces which define a longitudinal direction therebetween,
      (b) a plurality of discharge openings positioned adjacent each other in a longitudinal row along said front face and extending rearwardly into said block a substantial distance, and so that each discharge opening defines an inner end which is spaced from said rear face,
      (c) a first internal bore extending longitudinally within the interior of said block and communicating with each of said discharge openings at a medial portion of the rearward length of said openings,
      (d) a second internal bore extending longitudinally within the interior of said block and communicating with each of said discharge openings adjacent the inner end thereof,
      (e) first duct means communicating with said rear face for delivering a first gas to said first internal bore,
      (f) second duct means communicating with said rear face for delivering a second gas to said second internal bore,
   said first gas outlet comprising a longitudinally extending channel formed in said front face of said base member, and said first duct means comprising a plurality of longitudinally spaced apart parallel ducts in said extension, and
   means interconnecting said extension and said base member with said rear face of said extension overlying and engaging said front face of said base member, and such that said first gas outlet of said base member communicates with said first duct means of said extension and said second gas outlet of said base member communicates with said second duct means of said extension, whereby a first gas may be supplied to said first gas supply duct of said base member and delivered to said first internal bore of said extension, and a second gas may be supplied to said second gas supply duct and delivered to said second internal bore of said extension.

3. The apparatus as defined in claim 2 wherein said second gas outlet comprises a longitudinally extending channel formed in said front face of said base member, and said second duct means comprises a plurality of longitudinally spaced apart parallel ducts in said extension.

4. A block assembly for directing multiple streams of gas onto the surface of a metal workpiece during a scarfing operation, and comprising
  a block of metallic material including opposite front and rear faces, opposite upper and lower faces, and opposite end faces which define a longitudinal direction therebetween,
  a plurality of discharge openings positioned adjacent each other in a longitudinal row along said front face and extending rearwardly into said block a substantial distance, and so that each discharge opening defines an inner end which is spaced from said rear face,
  a first internal bore extending longitudinally within the interior of said block and communicating with each of said discharge openings at a medial portion of the rearward length of said openings,
  a second internal bore extending longitudinally within the interior of said block and communicating with each of said discharge openings adjacent the inner end thereof,
  first duct means for delivering a first gas to said first internal bore,
  second duct means for delivering a second gas to said second internal bore,
  discharge outlet means extending longitudinally along said front face of said block and parallel to said row of discharge openings, and third duct means for delivering the second gas to said discharge outlet means,
  whereby the first and second gases may be concurrently delivered into each of said discharge openings at spaced apart locations and so that the gases flow outwardly from each of said discharge openings at said front face.

5. The apparatus as defined in claim 4 wherein said third duct means comprises a third internal bore extending longitudinally within the interior of said block, first gas passage means communicating between said second internal bore and said third internal bore, and second gas passage means extending between said third internal bore and said discharge outlet means.

6. The apparatus as defined in claim 5 wherein said discharge outlet means comprises a row of discharge outlets which is parallel to said row of discharge openings.

7. A block assembly for directing multiple steams of gas onto the surface of a metal workpiece during a scarfing operation, and comprising
  a block of metallic material including opposite front and rear faces, opposite upper and lower faces, and opposite end faces which define a longitudinal direction therebetween,
  a plurality of discharge openings positioned adjacent each other in a longitudinal row along said front face and extending rearwardly into said block a substantial distance, and so that each discharge opening defines an inner end which is spaced from said rear face,
  a first internal bore extending longitudinally within the interior of said block and communicating with each of said discharge openings at a medial portion of the rearward length of said openings,
  a second internal bore extending longitudinally within the interior of said block and communicating with each of said discharge openings adjacent the inner end thereof,
  first duct means for delivering a first gas to said first internal bore,
  second duct means for delivering a second gas to said second internal bore,
  a further internal bore extending longitudinally within the interior of said block adjacent said front face thereof, and water passageway means communicating with said further internal bore and with said rear face of said block for circulating water through said further internal bore so as to cool the block,
  whereby the first and second gases may be concurrently delivered into each of said discharge openings at spaced apart locations and so that the gases flow outwardly from each of said discharge openings at said front face.

8. A block assembly for directing multiple steams of gas onto the surface of a metal workpiece during a scarfing operation, and comprising
  a block of metallic material including opposite front and rear faces, opposite upper and lower faces, and opposite end faces which define a longitudinal direction therebetween,
  a plurality of discharge openings positioned adjacent each other in a longitudinal row along said front face and extending rearwardly into said block a substantial distance, and so that each discharge opening defines an inner end which is spaced from said rear face,
  a first internal bore extending longitudinally within the interior of said block and communicating with each of said discharge openings at a medial portion of the rearward length of said openings,
  a second internal bore extending longitudinally within the interior of said block and communicating with each of said discharge openings adjacent the inner end thereof,
  first duct means for delivering a first gas to said first internal bore,
  second duct means for delivering a second gas to said second internal bore,
  an elongate nozzle insert disposed in each of said discharge openings, with each of said nozzle inserts comprising a central bore extending axially through the length thereof and so as to define an inner end of said central bore which communicates with said inner end of the associated discharge opening and thus with said second internal bore, sealing means cooperating with the portion of the associated discharge opening between said first and second internal bores for forming a seal between said portion of the associated discharge opening and the outer periphery of the nozzle insert, a plurality of axially extending substantially parallel flutes spaced about the exterior surface of the nozzle insert and between said first internal bore and said front face of said block and such that the flutes and the discharge opening define an outer channel which extends from said first internal bore to said front face of said block, whereby the second gas may be discharged from said central bore of each of said nozzle inserts as a central gas stream and while the first gas may be discharged from each of said discharge openings as a concentric stream disposed coaxially about said central stream,
  whereby the first and second gases may be concurrently delivered into each of said discharge openings at spaced apart locations and so that the gases flow outwardly from each of said discharge openings at said front face.

9. A block assembly for directing multiple steams of gas onto the surface of a metal workpiece during a scarfing operation, and comprising:
   a base member comprising
      (a) a block of metallic material including opposite front and rear faces,
      (b) a first gas outlet communicating with said front face of said block, and a first gas supply duct extending through said block from said rear face thereof to said first gas outlet,
      (c) a second gas outlet communicating with said front face of said block, and a second gas supply duct extending through said block from said rear face thereof to said second gas outlet, and
   an extension comprising
      (a) a block of metallic material including opposite front and rear faces, opposite upper and lower faces, and opposite end faces which define a longitudinal direction therebetween,
      (b) a plurality of discharge openings positioned adjacent each other in a longitudinal row along said front face and extending rearwardly into said block a substantial distance, and so that each discharge opening defines an inner end which is spaced from said rear face,
      (c) a first internal bore extending longitudinally within the interior of said block and communicating with each of said discharge openings at a medial portion of the rearward length of said openings,
      (d) a second internal bore extending longitudinally within the interior of said block and communicating with each of said discharge openings adjacent the inner end thereof,
      (e) first duct means communicating with said rear face for delivering a first gas to said first internal bore,
      (f) second duct means communicating with said rear face for delivering a second gas to said second internal bore,
   said extension further comprising discharge outlet means extending longitudinally along said front face of said block of said extension and parallel to said row of discharge openings, and third duct means for delivering the second gas from said second internal bore to said discharge outlet means,
   means interconnecting said extension and said base member with said rear face of said extension overlying and engaging said front face of said base member, and such that said first gas outlet of said base member communicates with said first duct means of said extension and said second gas outlet of said base member communicates with said second duct means of said extension, whereby a first gas may be supplied to said first gas supply duct of said base member and delivered to said first internal bore of said extension, and a second gas may be supplied to said second gas supply duct and delivered to said second internal bore of said extension.

10. A block assembly for directing multiple streams of gas onto the surface of a metal workpiece during a scarfing operation, and comprising:
   a base member comprising
      (a) a block of metallic material including opposite front and rear faces,
      (b) a first gas outlet communicating with said front face of said block, and a first gas supply duct extending through said block from said rear face thereof to said first gas outlet,
      (c) a second gas outlet communicating with said front face of said block, and then a second gas supply duct extending through said block from said rear face thereof to said second gas outlet, and
   an extension comprising
      (a) a block of metallic material including opposite front and rear faces, opposite upper and lower faces, and opposite end faces which define a longitudinal direction therebetween,
      (b) a plurality of discharge openings positioned adjacent each other in a longitudinal row along said front face and extending rearwardly into said block a substantial distance, and so that each discharge opening defines an inner end which is spaced from said rear face,
      (c) a first internal bore extending longitudinally within the interior of said block and communicating with each of said discharge openings at a medial portion of the rearward length of said openings,
      (d) a second internal bore extending longitudinally within the interior of said block and communicating with each of said discharge openings adjacent the inner end thereof,
      (e) first duct means communicating with said rear face for delivering a first gas to said first internal bore,
      (f) second duct means communicating with said rear face for delivering a second gas to said second internal bore,
   said extension further comprising an elongate nozzle insert disposed in each of said discharge openings, with each of said nozzle inserts comprising a central bore extending axially through the length thereof and so as to define an inner end of said central bore which communicates with said inner end of the associated discharge opening and thus with said second internal bore, sealing means cooperating with the portion of the associated discharge opening between said first and second internal bores for forming a seal between said portion of the associated discharge opening and the outer periphery of the nozzle insert, a plurality of axially extending substantially parallel flutes spaced about the exterior surface of the nozzle insert and between said first internal bore and said front face of said block of said extension and such that the flutes and the discharge opening define an outer channel which extends from said first internal bore to said front face of said block of said extension, whereby the second gas may be discharged from said central bore of each of said nozzle inserts as a central gas stream and while the first gas may be discharged from each of said discharge openings as a concentric stream disposed coaxially about said central stream,
   means interconnecting said extension and said base member with said rear face of said extension overlying and engaging said front face of said base member, and such that said first gas outlet of said base member communicates with said first duct means of said extension and said second gas outlet of said base member communicates with said second duct means of said extension, whereby a first gas may be supplied to said first gas supply duct of said base member and delivered to said first internal bore of said extension, and a second gas may be supplied to said second gas supply duct and delivered to said second internal bore of said extension.

* * * * *

UNITED STATES PATENT AND TRADEMARK OFFICE
CERTIFICATE OF CORRECTION

PATENT NO. : 5,358,221

DATED : October 25, 1994

INVENTOR(S) : Showalter et al.

It is certified that error appears in the above-identified patent and that said Letters Patent is hereby corrected as shown below:

Column 4, line 31, after "slot", "27" should be -- 26 --.

Column 4, line 49, after "shoe" insert -- 32 --.

Column 4, line 65, before "47" insert -- 46, --.

Column 4, line 67, after "face" insert -- 46 --.

Column 7, line 14, after "face" insert -- 66. --.

Column 7, line 15, after "face" insert -- 67, --.

Signed and Sealed this

Tenth Day of January, 1995

Attest:

BRUCE LEHMAN

*Attesting Officer*     *Commissioner of Patents and Trademarks*